United States Patent
Zhao et al.

(10) Patent No.: US 12,475,805 B1
(45) Date of Patent: Nov. 18, 2025

(54) METHODS AND SYSTEMS FOR COOPERATIVE AIRBORNE METEOROLOGICAL PERCEPTION WITH MULTIPLE AIRCRAFT

(71) Applicant: BEIHANG UNIVERSITY, Beijing (CN)

(72) Inventors: Peng Zhao, Beijing (CN); Kaiquan Cai, Beijing (CN); Hanjie Xu, Beijing (CN); Yuhang Fang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 19/071,739

(22) Filed: Mar. 5, 2025

(30) Foreign Application Priority Data

Dec. 24, 2024 (CN) .......................... 202411911200.2

(51) Int. Cl.
*G08G 5/56* (2025.01)
*B64C 13/16* (2006.01)
(Continued)

(52) U.S. Cl.
CPC .............. *G08G 5/56* (2025.01); *B64C 13/16* (2013.01); *B64D 31/06* (2013.01); *G01W 1/06* (2013.01);
(Continued)

(58) Field of Classification Search
CPC .. G08G 5/56; G08G 5/25; G08G 5/26; G08G 5/30; G08G 5/34; G01W 1/06;
(Continued)

(56) References Cited

U.S. PATENT DOCUMENTS

| | | | |
|---|---|---|---|
| 6,683,609 B1 * | 1/2004 | Baron, Sr. ............... | G06T 17/05 345/419 |
| 2010/0103029 A1 * | 4/2010 | Khatwa ................. | G01S 13/953 342/26 B |

(Continued)

FOREIGN PATENT DOCUMENTS

WO WO-2024177511 A1 * 8/2024 ........... G01C 21/005

*Primary Examiner* — Jason Holloway
*Assistant Examiner* — Benjamin J Brosh
(74) *Attorney, Agent, or Firm* — PORUS IP LLC

(57) ABSTRACT

Provided are a method and a system for cooperative airborne meteorological perception with multiple aircraft. The method includes: determining a training set based on a spatial position, motion data, weather, an observation image, and static information of each of multiple aircraft; determining a fusion performance function based on an objective of a cooperative perception network; generating a fusion model based on the training set and the fusion performance function; generating a perception result image based on the fusion model; determining flight risk information based on the perception result image; determining a route alarm command and sending the route alarm command to a management user interface and an interactive device of a target aircraft; after receiving the route alarm command, generating, by the management user interface, a route adjustment parameter; in response to obtaining the route adjustment parameter, performing at least one of the following operations: adjusting an engine velocity, adjusting an aileron pressure, adjusting an elevator deflection, and adjusting a rudder deflection.

18 Claims, 6 Drawing Sheets

(51) Int. Cl.
*B64D 31/06* (2006.01)
*G01W 1/06* (2006.01)
*G05D 1/617* (2024.01)
*G08G 5/25* (2025.01)
*G08G 5/30* (2025.01)
*G01S 13/95* (2006.01)
*G05D 109/20* (2024.01)

(52) U.S. Cl.
CPC ............... *G05D 1/621* (2024.01); *G08G 5/25* (2025.01); *G08G 5/30* (2025.01); *G01S 13/95* (2013.01); *G05D 2109/20* (2024.01)

(58) Field of Classification Search
CPC ....... G01W 1/02; G05D 1/621; G05D 1/1062; G05D 2111/60; G05D 2111/67; G05D 2101/10; G05D 2109/20; B64C 13/16; B64D 31/06; G01S 13/95
See application file for complete search history.

(56) References Cited

U.S. PATENT DOCUMENTS

| | | | |
|---|---|---|---|
| 2010/0245164 A1* | 9/2010 | Kauffman | G01S 7/22 342/26 B |
| 2018/0047294 A1* | 2/2018 | Esposito | G08G 5/21 |
| 2018/0074189 A1* | 3/2018 | Khatwa | G01S 13/87 |
| 2018/0149745 A1* | 5/2018 | Christianson | G01S 7/064 |
| 2022/0075060 A1* | 3/2022 | Woodell | G01S 13/953 |
| 2022/0366231 A1* | 11/2022 | Zhu | G06N 3/0895 |
| 2024/0282203 A1* | 8/2024 | Rose | G08G 5/34 |

\* cited by examiner

200

```
┌─────────────────────────────────────────────────────────────┐
│ Collecting a spatial position, motion data, weather, an observation │
│ image, and static information of each of the multiple aircraft based │
│ on a weather radar, a Global Positioning System (GPS), an inertial   │─210
│ navigation system, and a flight management system disposed on       │
│ each of multiple aircraft, and determining a training set based on the │
│ spatial position, the motion data, the weather, the observation image, │
│ and the static information                                           │
└─────────────────────────────────────────────────────────────┘
                              ↓
┌─────────────────────────────────────────────────────────────┐
│ Determining a fusion performance function of a fusion model under a │─220
│ constraint of a total communication bandwidth based on an objective │
│ of a cooperative perception network                                 │
└─────────────────────────────────────────────────────────────┘
                              ↓
┌─────────────────────────────────────────────────────────────┐
│ Generating the fusion model based on the training set, the fusion   │─230
│ performance function, a spatiotemporal confidence level, a flight   │
│ intent, a two-way communication network, and an information         │
│ fusion function                                                      │
└─────────────────────────────────────────────────────────────┘
                              ↓
┌─────────────────────────────────────────────────────────────┐
│ Generating a perception result image of a target aircraft based on the │─240
│ fusion model                                                         │
└─────────────────────────────────────────────────────────────┘
                              ↓
┌─────────────────────────────────────────────────────────────┐
│ Determining, based on the perception result image, flight risk       │─250
│ information of the target aircraft                                   │
└─────────────────────────────────────────────────────────────┘
                              ↓
┌─────────────────────────────────────────────────────────────┐
│ Determining, based on the flight risk information and a risk threshold, │─260
│ a route alarm command, and sending the route alarm command to a       │
│ management user interface and an interactive device of the target     │
│ aircraft                                                              │
└─────────────────────────────────────────────────────────────┘
                              ↓
┌─────────────────────────────────────────────────────────────┐
│ In response to obtaining a route adjustment parameter from the        │
│ management user interface, performing at least one of the following   │
│ operations: adjusting an engine velocity based on an engine sub-      │─270
│ parameter, adjusting an aileron pressure based on an aileron sub-     │
│ parameter, adjusting an elevator deflection based on an elevator      │
│ sub-parameter, and adjusting a rudder deflection based on a rudder    │
│ sub-parameter                                                         │
└─────────────────────────────────────────────────────────────┘
```

FIG. 2

METHODS AND SYSTEMS FOR COOPERATIVE AIRBORNE METEOROLOGICAL PERCEPTION WITH MULTIPLE AIRCRAFT

CROSS-REFERENCE TO RELATED APPLICATIONS

This application claims priority of Chinese Patent Application No. 202411911200. 2, filed on Dec. 24, 2024, the entire contents of which are incorporated herein by reference.

TECHNICAL FIELD

This present disclosure relates to the technical field of air traffic management, and in particular, to a method and a system for cooperative airborne meteorological perception with multiple aircraft.

BACKGROUND

With the sustained development of the global economy and the continuous improvement of people's living standards, civil aviation, as a link connecting the whole world, shows a trend of continuous development. The trend is directly reflected in the number of flights, as well as the growing volume of passenger traffic. The rapid growth in air traffic not only brings development opportunities for airlines, but also challenges air traffic management. Therefore, it is necessary to provide a method and a system for cooperative airborne meteorological perception with multiple aircraft.

SUMMARY

One or more embodiments of the present disclosure provide a method for cooperative airborne meteorological perception with multiple aircraft. The method includes: collecting a spatial position, motion data, weather, an observation image, and static information of each of the multiple aircraft based on a weather radar, a Global Positioning System (GPS), an inertial navigation system, and a flight management system disposed on the each of the multiple aircraft, and determining a training set based on the spatial position, the motion data, the weather, the observation image, and the static information; determining a fusion performance function of a fusion model under a constraint of a total communication bandwidth based on an objective of a cooperative perception network; generating the fusion model based on the training set, the fusion performance function, a spatiotemporal confidence level, a flight intent, a two-way communication network, and an information fusion function; wherein the spatiotemporal confidence level is generated based on a confidence module, the confidence module being configured to generate a spatial confidence map and a temporal confidence map; the flight intent is generated based on processing of input information by the flight intent module, the input information including at least one of the spatial position, the motion data, the weather, and the static information; the two-way communication network is configured to transmit feature information between the multiple aircraft; and the information fusion function is generated based on an information fusion module, the information fusion module being configured to fuse the spatiotemporal confidence level and the flight intent based on a cooperative directed graph among the multiple aircraft under the two-way communication network. The method further includes: generating a perception result image of a target aircraft based on the fusion model; determining, based on the perception result image, flight risk information of the target aircraft, the flight risk information including at least one region and at least one flight risk factor corresponding to the at least one region; determining, based on the flight risk information and a risk threshold, a route alarm command, and sending the route alarm command to a management user interface and an interactive device of the target aircraft; and in response to obtaining a route adjustment parameter from the management user interface, performing at least one of the following operations: adjusting an engine velocity based on an engine sub-parameter, adjusting an aileron pressure based on an aileron sub-parameter, adjusting an elevator deflection based on an elevator sub-parameter, and adjusting a rudder deflection based on a rudder sub-parameter; the route adjustment parameter including at least one of the engine sub-parameter, the aileron sub-parameter, the elevator sub-parameter, and the rudder sub-parameter.

One of the embodiments of the present disclosure provides a system for cooperative airborne meteorological perception with multiple aircraft. The system includes a training set determination unit, a function determination unit, a model generation unit, an image generation unit, an information determination unit, an instruction determination unit, and an adjustment unit. The training set determination unit is configured to collect a spatial position, motion data, weather, an observation image, and static information of each of the multiple aircraft based on a weather radar, a GPS, an inertial navigation system, and a flight management system disposed on the each of the multiple aircraft, and determine a training set based on the spatial position, the motion data, the weather, the observation image, and the static information. The function determination unit is configured to determine a fusion performance function of a fusion model under a constraint of a total communication bandwidth based on an objective of a cooperative perception network. The model generation unit is configured to generate the fusion model based on the training set, the fusion performance function, a spatiotemporal confidence level, a flight intent, a two-way communication network, and an information fusion function; wherein the spatiotemporal confidence level is generated based on a confidence module, the confidence module being configured to generate a spatial confidence map and a temporal confidence map; the flight intent is generated based on processing of input information by the flight intent module, the input information including at least one of the spatial position, the motion data, the weather, and the static information; the two-way communication network is configured to transmit feature information between the multiple aircraft; and the information fusion function is generated based on an information fusion module, the information fusion module being configured to generate the information fusion model based on the information fusion module, the information fusion module being configured to fuse the spatiotemporal confidence level and the flight intent based on a cooperative directed graph among the multiple aircraft under the two-way communication network. The image generation unit is configured to generate a perception result image of a target aircraft based on the fusion model. The information determination unit is configured to determine, based on the perception result image, flight risk information of the target aircraft, the flight risk information including at least one region and at least one flight risk factor corresponding to the at least one region; the instruction determination unit is configured to determine, based on the flight risk information and a risk threshold, a route alarm command, and send the route alarm command to a management user interface and an interactive device of the target aircraft. The adjustment unit is configured to in response to obtaining a route adjustment parameter from the management user interface, perform at least one of the following operations: adjusting an engine velocity based on an engine sub-parameter, adjusting an aileron pressure based on an aileron sub-parameter, adjusting an elevator deflection based on an elevator sub-parameter, and adjusting a rudder deflection based on a rudder sub-parameter; the route adjustment parameter including at least one of the engine sub-parameter, the aileron sub-parameter, the elevator sub-parameter, and the rudder sub-parameter.

One or more embodiments of the present disclosure provide a non-transitory computer-readable storage medium storing computer instructions, wherein when a computer reads the computer instructions in the storage medium, the computer implements the method for cooperative airborne meteorological perception with multiple aircraft disclosed in some embodiments of the present disclosure.

BRIEF DESCRIPTION OF THE DRAWINGS

The present disclosure will be further illustrated by way of exemplary embodiments, which are described in detail with the accompanying drawings. These embodiments are non-limiting. In these embodiments, the same number indicates the same structure, wherein:

FIG. 2 is a flowchart illustrating an exemplary process of method for cooperative airborne meteorological perception with multiple aircraft according to some embodiments of the present disclosure;

DETAILED DESCRIPTION

Figure 1:
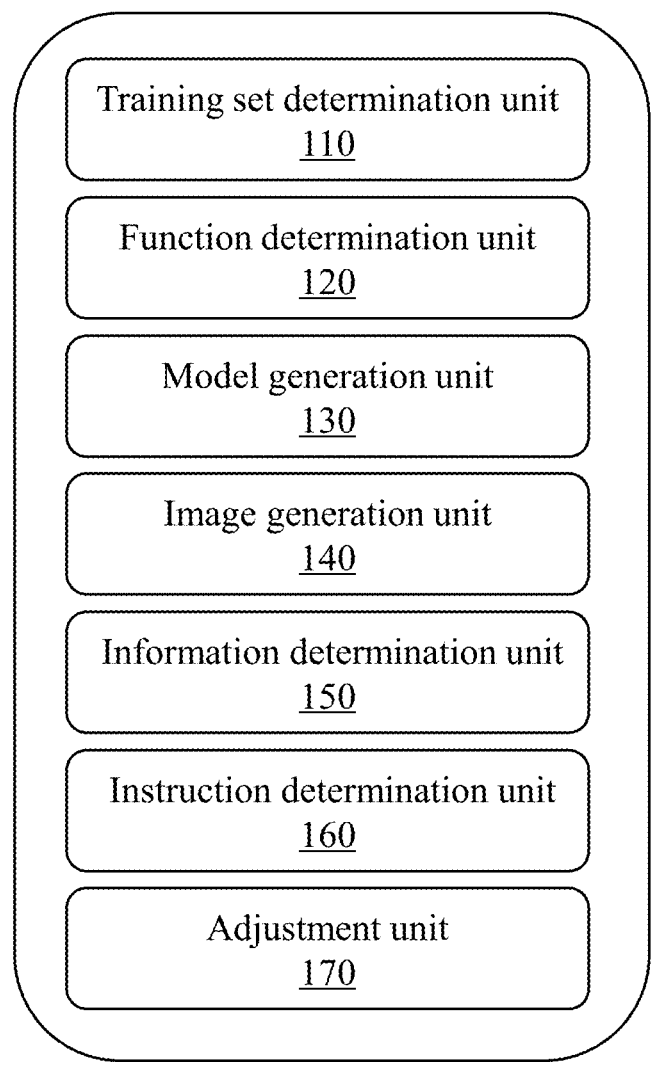
FIG. 1 is a block diagram illustrating exemplary units of an exemplary system for cooperative airborne meteorological perception with multiple aircraft according to some embodiments of the present disclosure.

In order to more clearly illustrate the technical solutions of the embodiments of the present disclosure, the accompanying drawings to be used in the description of the embodiments will be briefly described below. Obviously, the accompanying drawings in the following description are only some examples or embodiments of the present disclosure, and that the present disclosure may be applied to other similar scenarios in accordance with these drawings without creative labor for those of ordinary skill in the art. Unless obviously acquired from the context or the context illustrates otherwise, the same numeral in the drawings refers to the same structure or operation.

It should be understood that "system," "device," "unit," and/or "module" as used herein is a way to distinguish between different components, elements, parts, sections, or assemblies at different levels. However, these words may be replaced by other expressions if they accomplish the same purpose.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operations performed by the system according to some embodiments of the present disclosure. It should be understood that the operations described herein are not necessarily executed in a specific order. Instead, they may be executed in reverse order or simultaneously. Additionally, one or more other operations may be added to these processes, or one or more operations may be removed.

With the continuous development of civil aviation, the number of flights and passenger traffic has been increasing year by year. The rapid growth in air traffic volume has led to an increase in the complexity of air traffic operations, making it difficult for the current centralized separation control model to meet the safety operation requirements in highly complex airspace environments. Many existing main route networks have exceeded their capacity limits, resulting in frequent flight delays during peak periods and placing significant pressure on air traffic management. The traditional centralized operation mode, which focuses on ground control, is gradually becoming inadequate to meet the operational demands in highly complex airspace environments.

To address this challenge, the civil aviation industry has proposed the concept of "autonomous air traffic operations," aiming to enhance navigation flexibility and safety. Onboard situational perception is the primary prerequisite for autonomous air traffic operations, and credible and accurate airspace situational information is the foundation for subsequent tasks such as trajectory decision-making and conflict resolution. Currently, there are two main approaches to civil aviation onboard situational perception: 1) Traditional onboard situational perception, which relies on single-aircraft sensors and instruments, has limited perception range and capabilities; 2) Ground-based surveillance system uploads, where ground detection stations have long detection ranges but poor real-time and dynamic perception.

To overcome the above technical difficulties, multi-aircraft situational collaborative perception has provided a new solution for situational perception in future autonomous operations scenarios. The goal is to enable multi-aircraft collaborative situational information sharing within a given region, enhancing the reliability, awareness range, and robustness of the air traffic system.

However, current research on onboard collaborative situational perception technology is still in its early stages and faces numerous challenges, such as the heterogeneity and complexity of data fusion from different sources, as well as limited communication resources. Therefore, to address the shortcomings of current technologies, there is an urgent need for a method and a system for cooperative airborne meteorological perception with multiple aircraft aimed at autonomous operations.

The following descriptions, in conjunction with the accompanying drawings, illustrate the method and the system for cooperative airborne meteorological perception with multiple aircraft described in the embodiments of the present disclosure.

FIG. 1 is a block diagram illustrating exemplary units of an exemplary system for cooperative airborne meteorological perception with multiple aircraft according to some embodiments of the present disclosure.

In some embodiments, a system 100 for cooperative airborne meteorological perception with multiple aircraft may include a training set determination unit 110, a function determination unit 120, a model generation unit 130, an image generation unit 140, an information determination unit 150, an instruction determination unit 160, and an adjustment unit 170.

In some embodiments, the training set determination unit 110 is configured to collect a spatial position, motion data, weather, an observation image, and static information of each of the multiple aircraft based on a weather radar, a Global Positioning System (GPS), an inertial navigation system, and a flight management system disposed on the each of the multiple aircraft, and determine a training set based on the spatial position, the motion data, the weather, the observation image, and the static information.

In some embodiments, the training set determination unit 110 may determine a data set based on the spatial position, the motion data, the weather, the observation image, and the static information; and determine a training set and a test set based on an integrated information priority of the data set.

In some embodiments, a learning rate of the training set is related to at least one of an image deviation value and a rerouting count in the training set.

In some embodiments, the weather includes at least one of precipitation, hail, a thunderstorm, and turbulence.

In some embodiments, the motion data includes at least one of an aircraft velocity, an aircraft heading angle, and a flight plan.

In some embodiments, the static information includes at least one of a latitude and longitude position of a waypoint and airport information.

In some embodiments, the function determination unit 120 is configured to determine a fusion performance function of a fusion model under a constraint of a total communication bandwidth based on an objective of a cooperative perception network.

In some embodiments, the model generation unit 130 is configured to generate the fusion model based on the training set, the fusion performance function, a spatiotemporal confidence level, a flight intent, a two-way communication network, and an information fusion function. The spatiotemporal confidence level is generated based on a confidence module, the confidence module being configured to generate a spatial confidence map and a temporal confidence map. The flight intent is generated based on the processing of input information by the flight intent module, the input information including at least one of the spatial position, the motion data, the weather, and the static information. The two-way communication network is configured to transmit feature information between the multiple aircraft. The information fusion function is generated based on an information fusion module, wherein the information fusion module is configured to generate the information fusion model based on the information fusion module, and the information fusion module is configured to fuse the spatiotemporal confidence level and the flight intent based on a cooperative directed graph among the multiple aircraft under the two-way communication network.

In some embodiments, the model generation unit 130 is further configured to transmit feature information of a critical region based on an information priority and a transmission communication delay.

In some embodiments, the model generation unit 130 is further configured to transmit the feature information of the critical region based on the information priority, the transmission communication delay, and an environmental anomaly value of the critical region.

In some embodiments, the confidence module includes a feature encoding module, a generation module, and a confidence sub-module. The feature encoding module is configured to extract a high-dimensional feature from the observation image and generate a feature map for the communication of the multiple aircraft; the feature map being generated by convoluting an RGB image through multiple layers of convolution to extract an edge, a texture, a geometric shape, and an intensity feature of the weather in a prediction image. The generation module is configured to generate a spatial confidence map based on the feature map of each round of communication of each of the multiple aircraft. The confidence sub-module is configured to simulate temporal decay of a temporal confidence level using an exponential decay function.

In some embodiments, the flight intent module is configured to generate a flight intent based on a spatial likelihood factor and a temporal likelihood factor.

In some embodiments, for an aircraft of the multiple aircraft, the model generation unit 130 is further configured to determine a perception confidence level of the aircraft and a perception request received from one or more other aircraft of the multiple aircraft, and extract the feature information based on the perception confidence level and the perception request.

In some embodiments, the image generation unit 140 is configured to generate a perception result image of a target aircraft based on the fusion model.

In some embodiments, the information determination unit 150 is configured to determine flight risk information of the target aircraft based on the perception result image. The flight risk information includes at least one region and at least one flight risk factor corresponding to the at least one region.

In some embodiments, the instruction determination unit 160 is configured to determine a route alarm command based on the flight risk information and a risk threshold, and send the route alarm command to a management user interface and an interactive device of the target aircraft.

In some embodiments, the risk threshold is related to a route operating duration, an usage duration of the target aircraft, and a network sparsity value of the two-way communication network.

In some embodiments, the adjustment unit 170 is configured to, in response to obtaining a route adjustment parameter from the management user interface, perform at least one of the following operations: adjusting an engine velocity based on an engine sub-parameter, adjusting an aileron pressure based on an aileron sub-parameter, adjusting an elevator deflection based on an elevator sub-parameter, and adjusting a rudder deflection based on a rudder sub-parameter. The route adjustment parameter includes at least one of the engine sub-parameter, the aileron sub-parameter, the elevator sub-parameter, and the rudder sub-parameter.

For more description of the above, please refer to the relevant descriptions in FIG. 2-FIG. 7.

It should be noted that the above descriptions of the system for cooperative airborne meteorological perception with multiple aircraft and its modules are provided only for descriptive convenience, and do not limit the present disclosure to the scope of the cited embodiments. It is to be understood that for a person skilled in the art, after understanding the principle of the system, it may be possible to arbitrarily combine individual modules or form a sub-system to be connected to other modules without departing from this principle.

FIG. 2 is a flowchart illustrating an exemplary process of method for cooperative airborne meteorological perception with multiple aircraft according to some embodiments of the present disclosure.

In some embodiments, process 200 may be performed by a system for cooperative airborne meteorological perception with multiple aircraft. As shown in FIG. 2, process 200 includes operations 210-270. It should be noted that operation 210 to operation 230 are a process of generating a fusion model, and the operation 240 to the operation 270 are a process of applying the fusion model.

In 210, a spatial position, motion data, weather, an observation image, and static information of each of the multiple aircraft are collected based on a weather radar, GPS, an inertial navigation system, and a flight management system disposed on the each of the multiple aircraft, and a training set is determined based on the spatial position, the motion data, the weather, the observation image, and the static information. In some embodiments, operation 210 may be performed by the training set determination unit 110.

An aircraft is a machine capable of traveling through the atmosphere. For example, the aircraft may include an airplane, a helicopter, a glider, a drone, etc.

The weather radar refers to a radar used to detect atmospheric conditions. In some embodiments, the weather radar may include at least one of a Doppler weather radar, a dual polarization radar, and a phased array radar.

The GPS is a system that uses satellite signals for positioning and navigation.

The inertial navigation system refers to an autonomous navigation system that does not rely on external information or radiate energy to the outside.

The flight management system is a computer-centered navigation system, a guidance system, and a performance management system. In some embodiments, the flight management system may be communicatively coupled to the weather radar, the GPS, and the inertial navigation system.

The spatial position is a position where the aircraft is positioned. For example, the spatial position may be a latitude and longitude grid position of the aircraft. In some embodiments, the training set determination unit may collect the spatial positions of the multiple aircraft based on the GPS.

The motion data is data related to the motion of the aircraft. In some embodiments, the motion data includes an aircraft velocity, an aircraft heading angle, and a flight plan.

The aircraft velocity refers to a velocity at which the aircraft flies.

The aircraft heading angle refers to an angle of a forward direction of the aircraft relative to a datum line. In some embodiments, the datum line may include one of a geographic meridian north end, a magnetic meridian north end, a compass meridian north end, etc. In some embodiments, the datum line may also be set by a person skilled in the art based on practical needs. The flight plan refers to a flight time, a flight route, etc., of the aircraft.

In some embodiments, the training set determination unit 110 may detect the motion data of the aircraft based on the inertial navigation system.

In some embodiments, the weather includes at least one of precipitation, hail, a thunderstorm, and turbulence. The weather may also be referred to as a meteorological condition. In some embodiments, the training set determination unit 110 may extract the weather through the flight management system.

The observation image refers to an image of the meteorological condition. In some embodiments, the observation image may include a bird's eye view (BEV) of a surrounding meteorological condition and an observation image in the form of an RGB image representing echo data from the weather radar.

In some embodiments, the observation image may include a red color, a yellow color, and a green color. The color of the observation image may represent a magnitude of a radar echo intensity of an observed region. The greater the radar echo intensity is, the greater intensity of precipitation, hails, thunderstorm, and turbulence in the observed region is. The observed region is a region where the meteorological observation is conducted. For example, the observed region may be a flight route of the aircraft.

Merely by way of example, the red color represents that the radar echo intensity of the observed region is greater than a first echo intensity threshold. The yellow color represents that the radar echo intensity of the observed region is less than the first echo intensity threshold and greater than a second echo intensity threshold. The green color represents that the radar echo intensity of the observed region is less than the second echo strength threshold and greater than 0. Colorless represents that the radar echo intensity is 0. The first echo strength threshold and the second echo strength threshold may be preset by a person skilled in the art based on experience.

In some embodiments, the training set determination unit 110 may obtain the observation image based on an electromagnetic wave emitted by the weather radar, and a signal reflected from the electromagnetic wave from a target object (e.g., rain, hail, etc.).

The static information refers to information that does not change with time or an event. In some embodiments, the static information may include at least one of a latitude and longitude position of a waypoint and airport information.

The latitude and longitude position of the waypoint is a latitude and longitude position of a waypoint on the flight route of the aircraft.

In some embodiments, the training set determination unit 110 may extract the static information based on the flight management system.

The airport information refers to information related to an airport. In some embodiments, the airport information may include a position, a number, and a length of a runway in the airport, a name of the airport, and a latitude and longitude position of the airport.

The training set refers to a set of data used to train a fusion model. In some embodiments, the training set may include a training sample and a label of the training sample. The training sample may include sample spatial positions, sample motion data, sample weather, sample observation images, and sample static information of multiple sample aircraft, and the label corresponding to the training sample may be a truth perception image. The truth perception image refers to an image measured by a ground-based weather radar, a meteorological satellite, or the like. The truth perception image may be an RGB radar echo image.

In some embodiments, the training set determination unit 110 may determine a plurality of training sets for training the fusion model through operation 220. For more descriptions of the fusion model, please refer to the relevant descriptions below.

In 220, a fusion performance function of the fusion model is determined based on an objective of a cooperative perception network under a constraint of a total communication bandwidth. In some embodiments, operation 210 may be performed by the function determination unit 120.

The total communication bandwidth refers to a total count of bits transmitted per unit of time by the cooperative perception network of airborne meteorology with multiple aircraft. The cooperative perception network refers to a network system that collects, processes, shares, and analyzes environmental information through the joint cooperation of a plurality of sensor devices or perception nodes. The plurality of sensor devices or perception nodes are distributed in different aircraft.

In some embodiments, the total communication bandwidth may be obtained by Equation (1):

$$B = \log_2(|M_{i \to j}^{t,k}| \times D \times \text{float}), k = 0.1, 2, \ldots, K, \quad (1)$$

wherein B denotes the total communication bandwidth, $$M_{i \to j}^{t,k}$$

denotes a binary selection matrix of information in space transmitted by an $i^{th}$ aircraft to a $j^{th}$ aircraft in a $k^{th}$ communication round at a time t, $$|M_{i \to j}^{t,k}|$$

denotes a total count of grids of the information transmitted by the $i^{th}$ aircraft to the $j^{th}$ aircraft in the $k^{th}$ round of communication at the time t; D denotes a feature channel dimension; float denotes a precision coefficient; k denotes the communication round during which the information is transmitted from the $i^{th}$ aircraft to the $j^{th}$ aircraft; and K denotes a total count of communication rounds.

Merely by way of example, float=32/8.

Merely by way of example, element values of the binary selection matrix $$M_{i \to j}^{t,k}$$

include 1 and 0. A position with an element value of 1 represents the during the $k^{th}$ communication round at the time t, the $i^{th}$ aircraft needs to transmit feature information corresponding to the position to the $j^{th}$ aircraft. A position with an element value of 0 represents that no transmission is required.

The objective of the cooperative perception network is the objective achieved by the cooperative perception network of airborne meteorology with multiple aircraft.

In some embodiments, the objective of the cooperative perception network may be obtained by Equation (2):

$$\text{s.t.} \sum_{k=1}^{K} \sum_{i=1}^{N} |Z_{i \to j}^{t,k}| \leq B, \quad (2)$$

wherein B denotes the total communication bandwidth, $$Z_{j \to i}^{t,k}$$

represents the information transmitted by the $i^{th}$ aircraft to the $j^{th}$ aircraft in the $k^{th}$ communication round at the time t, $$|Z_{j \to i}^{t,k}|$$

denotes a communication bandwidth consumed by the transmission of the information from the $i^{th}$ aircraft to the $j^{th}$ aircraft in the $k^{th}$ round of communication at the time t, k denotes the communication round during which the information is transmitted from the $i^{th}$ aircraft to the $j^{th}$ aircraft; K denotes the total count of the communication rounds, and N represents a total count of the multiple aircraft.

In some embodiments of the present disclosure, the cooperative perception network can achieve multiple rounds of communication under limited communication resources, especially in bandwidth-constrained scenarios, thereby enhancing the effectiveness of collaborative perception.

The fusion model is a model configured to generate a perception result image. In some embodiments, the fusion model may be constructed based on a Convolutional Neural Network (CNN) and a multi-head attention mechanism.

A fusion performance of the fusion model reflects a fusion level of a plurality of parameters and metrics of an image output by the fusion model. For example, the plurality of parameters and metrics may include a detection range, a detection accuracy, a distance, a communication bandwidth, presence or absence of a radar shadow zone, etc. The fusion performance function refers to a function used to measure a difference between a predicted result of the fusion model and a truth label.

In some embodiments, the function determining unit 120 may determine the fusion performance function of the fusion model in a plurality of manners, so as to determine a maximized fusion performance of the fusion model. The maximized fusion performance refers that the established fusion model occupying as little bandwidth as possible while achieving an optimal image fusion effect.

In some embodiments, the fusion performance function may be obtained by Equation (3):

$$\underset{\theta}{\arg\max} \sum_{i=1}^{N} e\left(\Phi_\theta\left(X_i^t, \{Z_{j \to i}^{t,k}\}_{j=1}^{N}\right), Y_i^t\right), \quad (3)$$

wherein θ represents a parameter to be trained of the fusion model; e (•) denotes an image fusion evaluation metric; $\Phi_\theta$(•) denotes the fusion model;

$$X_i^t$$

represents an observation image of a surrounding meteorological condition generated by the $i^{th}$ aircraft at the tuner, and $$Y_i^t$$

represents a truth perception image of a surrounding meteorological condition generated by the $i^{th}$ aircraft at the time t.

It may be understood, the truth perception image $$Y_i^t$$

of the meteorological condition may be an RGB radar echo image, which may be used as a truth value for comparing fusion feature maps obtained by the fusion model during the training process, so that the fusion model may continuously refine its fused feature maps to approach the truth value as training progresses, until the fusion performance function converges, a count of iterations reaches a threshold, etc.

In some embodiments of the present disclosure, collaborative perception can enhance the aircraft's perception of meteorological conditions in the airspace. The aircraft can obtain clearer information about hazardous weather conditions such as thunderstorms, precipitation, and hail along the flight route, achieving the optimal image fusion effect.

In 230, the fusion model is generated based on the training set, the fusion performance function, a spatiotemporal confidence level, a flight intent, a two-way communication network, and an information fusion function. In some embodiments, operation 230 may be performed by the model generation unit 130.

In some embodiments, the parameter θ to be trained of the fusion model may include an image encoder $\Phi_{enc}(\bullet)$, a spatial confidence map generation function $\Phi_{generator}(\bullet)$, a selection function $\Phi_{select}(\bullet)$, and a feed-forward network $\Phi_{FFN}(\bullet)$ of an information fusion module in a confidence module.

In some embodiments, the spatiotemporal confidence level is generated based on the confidence module which is configured to generate a spatial confidence map and a temporal confidence map. The flight intent is generated based on the processing of input information by a flight intent module, wherein the input information include at least one of the spatial position, the motion data, the weather, and the static information. The two-way communication network is configured to transmit the feature information among the multiple aircraft. The information fusion function is generated based on the information fusion module, and the information fusion module is configured to fuse the spatiotemporal confidence level and the flight intent based on a cooperative directed graph among the multiple aircraft under the two-way communication network.

In some embodiments, operation 230 may be accomplished by operations 231-237.

In 231, a spatiotemporal confidence level is obtained through the confidence module based on observation images of the aircraft's surrounding meteorological condition at a current time and in a preset past time period.

The spatiotemporal confidence level refers to a confidence level of the observation image in time and space. In some embodiments, the spatiotemporal confidence level may include a temporal confidence map and a spatial confidence map which indicate the confidence level of the image fusion in time and space, respectively. In some embodiments, the spatiotemporal confidence level may be obtained through the confidence module.

The confidence module is configured to comprehensively evaluate the spatiotemporal confidence level of the observation image.

Figure 3:
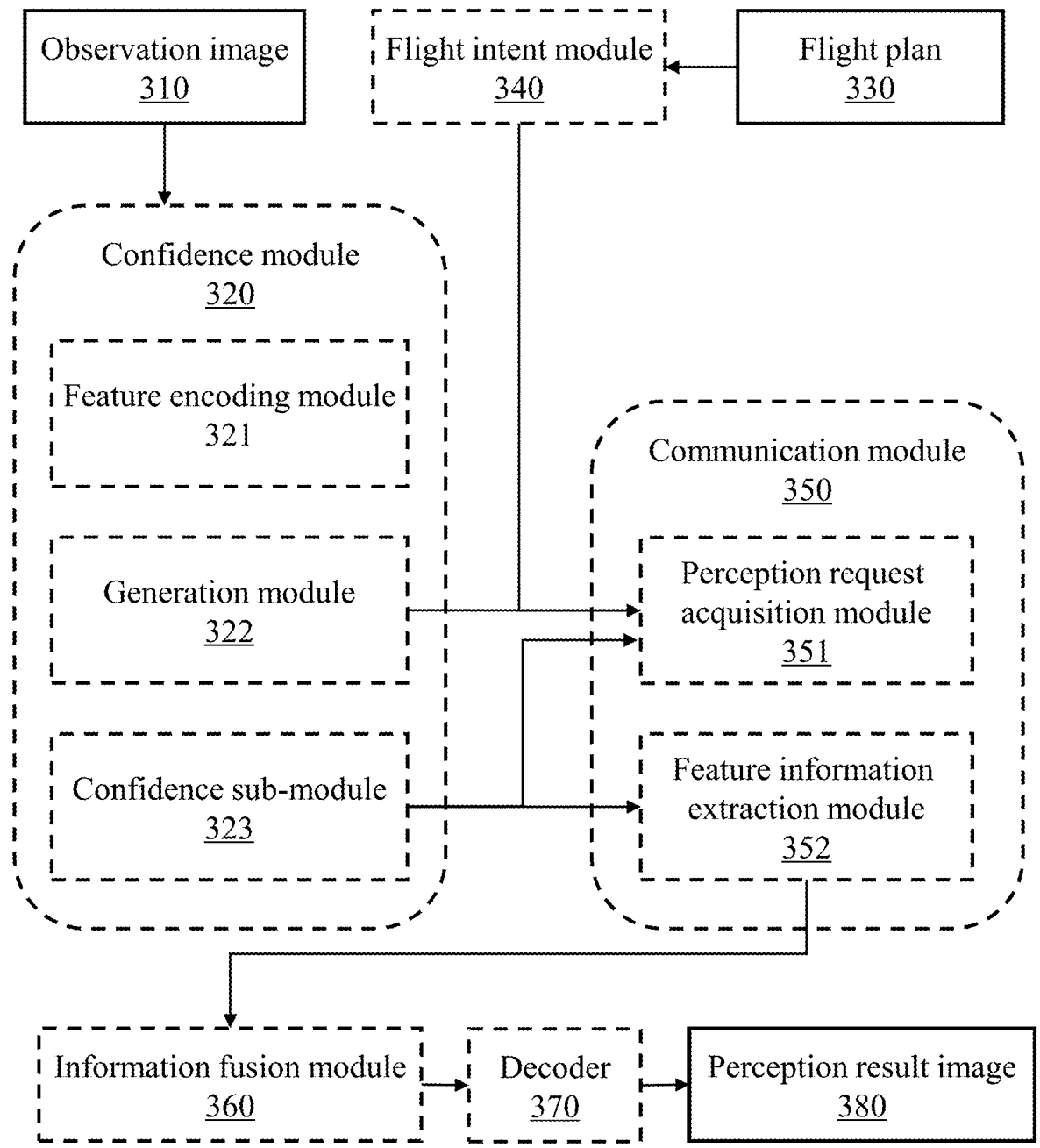
FIG. 3 is an exemplary schematic diagram illustrating the determination of a perception result image according to some embodiments of the present disclosure.

FIG. 3 is an exemplary schematic diagram illustrating the determination of a perception result image according to some embodiments of the present disclosure.

In some embodiments, as shown in FIG. 3, an input of a confidence module 320 includes an observation image of an aircraft's surrounding meteorological condition at a current time and in a preset past time period. The preset past time period may be set by a person skilled in the art based on experience.

In some embodiments, the confidence module 320 includes a feature encoding module 321, a generation module 322, and a confidence sub-module 323.

In some embodiments, operation 231 may be accomplished by operations S1-S3.

In S1, the feature encoding module is configured to extract a high-dimensional feature from the observation image of the aircraft and generate a feature map for the communication of the aircraft.

The feature map is a map related to a feature of the communication of the aircraft. In some embodiments, the feature encoding module 321 may extract a complex feature such as an edge, a texture, a geometric shape, a thunderstorm intensity, a precipitation intensity, etc., in a prediction image of a meteorological condition through multiple layers of convolution based on observation image in multiple formats (e.g., an RGB format), to compose the feature map as a basis for the computation of the spatial confidence level and the temporal confidence level.

In some embodiments, if the communication round during which information transmitted from an $i^{th}$ aircraft to a $j^{th}$ aircraft is an initial communication round (i.e., k=0), a feature map $$F_i^{t,0}$$

mapped from the encoded observation image at the time t may be obtained by Equation (4):

$$F_i^{t,0} = \Phi_{enc}(X_i^t) \in R^{H \times W \times D}, \quad (4)$$

wherein $$F_i^{t,0}$$

denotes the feature map or the $i^{th}$ aircraft in the initial communication round at the time t; $\Phi_{enc}(\bullet)$ denotes an image encoder; R represents a real number; H, W, and D represent a length, a width, and a count of channels of the feature map, respectively.

The image encoder is an encoder that transforms the observation image into a feature vector. In some embodiments, the image encoder includes two convolutional layers. The image encoder may convert the observation image in multiple formats (e.g., an RGB format) into vectors of multiple shapes. For example, the vector may be a 16×H×W vector.

In some embodiments, if k>0, the fusion model may use an output fused feature map $$F_i^{t,k+1}$$

of the $i^{th}$ aircraft in the previous communication round at the time t as the feature map of the $i^{th}$ aircraft in a current communication round at the time t. For example, in the case of multiple rounds of fusion, the fusion feature map output by an information fusion module in a first round is the feature map of the second communication round. For more descriptions of the fusion feature map, please refer to the relevant descriptions blow.

In some embodiments, the communication feature map is a feature map of 16 channels.

It may be understood, the feature map is obtained from the observation image by convoluting the observation image through multiple layers of convolution to extract an edge, a texture, a geometric shape, and a thunderstorm intensity and a precipitation intensity of the weather in a prediction image.

In S2, the generation module 322 generates a spatial confidence map based on the feature map for each communication round of each of multiple aircraft.

In some embodiments, the generation module 322 is a convolutional layer with 16 input channels and 1 output channel. A kernel size of the convolutional layer is 1. The generation module 322 may map an output value to a range between 0 and 1 through a sigmoid function.

For example, a spatial confidence map $$S_i^{t,k}$$

of the $i^{th}$ aircraft in the $k^{th}$ communication round at the time t may be obtained by Equation (5):

$$S_i^{t,k} = \Phi_{generator}(F_i^{t,k}) \in [0, 1]^{H \times W}, \tag{5}$$

where $\Phi_{generator}(\bullet)$ denotes a spatial confidence map generation function for converting a feature map $$F_i^{t,k}$$

of the $i^{th}$ aircraft in the $k^{th}$ communication round at the time t to a spatial confidence map $$S_i^{t,k}$$

with a value range of 0-1, consisting of a single convolution layer; and $$F_i^{t,k}$$

denotes the feature map of the $i^{th}$ aircraft in the $k^{th}$ communication round at the time t.

The spatial confidence map is obtained by traversing the spatial confidence map of each of the multiple aircraft in each communication round at each time.

In S3, the confidence sub-module 323 simulates temporal decay of the temporal confidence level using an exponential decay function, to generate the temporal confidence level of each of the multiple aircraft in each communication round at a time before a preset past time period. The preset past time period may be set by a person skilled in the art based on experience. For example, the preset past time period may be the past 30 minutes from the current time.

In some embodiments, a temporal confidence level of the $i^{th}$ aircraft in the $k^{th}$ communication round at the time t before a preset past time period $\Delta t$ may be obtained by Equation (6):

$$T_i^{t-\Delta t,k} = e^{-\lambda \Delta t}, \tag{6}$$

wherein $$T_i^{t-\Delta t,k}$$

denotes the temporal confidence of the $i^{th}$ aircraft in the $k^{th}$ communication round at the time t before the preset past time period; e denotes a natural constant; $\lambda$ denotes a decay coefficient; and $\Delta t$ denotes the preset past time period.

A vector of the temporal confidence level of each of the multiple aircraft in each communication round at each time is concatenated along a $0^{th}$ dimension, and a concatenated result is used as the temporal confidence map.

In 232, the flight intent is obtained based on the flight intent module of the aircraft.

The flight intent module is a module that generates the flight intent for the aircraft. In some embodiments, as shown in FIG. 3, a flight intent module 340 may generate the flight intent of the aircraft, which represents a distribution of probability values of regions the aircraft may reach within a future time period, based on a spatial position, motion data, a flight plan 330, weather, and static information of the aircraft, using a flight dynamics model of the aircraft, state information, and airspace environment data. The larger the value of the flight intent (i.e., the probability value) is, the greater a likelihood of the aircraft reaching the region, and the aircraft may pay more attention to the region in the subsequent cooperative communication.

The flight dynamics model of the aircraft refers to a physical model that reflects a law of motion and a flight performance of the aircraft in the air. In some embodiments, technical personnel may pre-construct the flight dynamics model of the aircraft to analyze and predict the flight performance (e.g., a stability, a maneuverability, a flight trajectory, etc.) of the aircraft.

The state information refers to information related to a current state of the aircraft. For example, the state information may include information such as a state of structural health, a state of a battery system, an operation age, etc., of the aircraft.

The airspace environment data refers to data related to an airspace environment. For example, the airspace environment data may include information such as terrain, topography, obstacle objects affecting flight safety, communication, navigation, and surveillance coverage, electromagnetic environment, power facilities, or the like.

In some embodiments, the airspace environmental data may be pre-entered into at least one of a flight management system and a ground control center by a person skilled in the art, and the aircraft may obtain the airspace environmental data through at least one of the flight management system and the ground control center. The ground control center refers to a center on the ground that is responsible for monitoring, navigating, and commanding the aircraft to perform a flight mission.

The flight intent is an image that represents the distribution of probability values of the regions the aircraft may reach in the future time period. In some embodiments, the flight intent module may obtain the flight intent of the aircraft based on a spatial likelihood factor and a temporal likelihood factor.

The spatial likelihood factor refers to a degree of a spatial similarity between a predicted arrival of the aircraft at a region and an actual arrival of the aircraft at a region. It may be understood that the spatial likelihood factor represents spatial information, and is used to estimate a state of the aircraft.

The temporal likelihood factor is a degree of a temporal similarity between the predicted arrival of the aircraft at a region and the actual arrival of the aircraft at a region. It may be understood that the temporal likelihood factor represents temporal information, and is used to estimate an arrival time of a target waypoint.

In some embodiments, operation 232 may be implemented through operations P1 to P3.

In P1, a spatial likelihood factor $\kappa_{i,1}$ of the $i^{th}$ aircraft may be obtained by Equation (7):

$$\kappa_{i,1} = \mathcal{N}_1(\psi_{i,r}(t) - \psi_{i,ac}(t); 0, \sigma_h^2), \qquad (7)$$

where $\kappa_{i,1}$ denotes the spatial likelihood factor of the $i^{th}$ aircraft; $\mathcal{N}_1(\cdot)$ denotes a normal distribution; $\psi_{i,r}(t)$ denotes an angle of the $i^{th}$ aircraft toward the target waypoint at the time t; $\psi_{i,ac}(t)$ denotes a heading angle of the $i^{th}$ aircraft at the time t; and a difference between the heading angle $\psi_{i,ac}$ and the angle of the $i^{th}$ aircraft toward the target waypoint follows a normal distribution with a mean of 0 and a standard deviation $\sigma_h = 5°$.

In some embodiments, the spatial position and the motion data of the $i^{th}$ aircraft are collected by at least one of the GPS, the inertial navigation system, and the flight management system of the aircraft, and the heading angle $\psi_{i,ac}$ and the angle of the $i^{th}$ aircraft toward the target waypoint at the time t are obtained based on the spatial position and the motion data of the $i^{th}$ aircraft.

Furthermore, the standard deviation $\sigma_h$ follows a 3σ principle of the normal distribution, i.e., $3\sigma_h$ ranges from ±15°, indicating that there is a 99.74% probability that the heading angle of the aircraft is distributed in a range of $\psi_r \pm 15°$.

In P2, a temporal likelihood factor $\kappa_{i,2}$ of the $i^{th}$ aircraft may be obtained by Equation (8):

$$\kappa_{i,2} = \mathcal{N}_2(TTG_i(WP_r); t_p, \sigma_{fp}^2), \qquad (8)$$

wherein $\kappa_{i,2}$ denotes the temporal likelihood factor of the $i^{th}$ aircraft; $\mathcal{N}_2(\cdot)$ denotes a normal distribution; $TTG_i(WP_r)$ denotes a time $WP_r$ for the $i^{th}$ aircraft to reach the target waypoint, which follow a normal distribution with a mean of ty and a standard deviation of $\sigma_{fp}$.

In P3, the flight intent module of the aircraft may obtain the flight intent based on a joint probability distribution of a likelihood function. Merely by way of example, a flight intent $I_i^t$ of the $i^{th}$ aircraft at the time t may be obtained by Equation (9):

$$I_i^t = \kappa_{i,1}\kappa_{i,2}, \qquad (9)$$

wherein $I_i^t$ denotes the flight intent of the $i^{th}$ aircraft at the time t; $\kappa_{i,1}$ denotes the spatial likelihood factor of the $i^{th}$ aircraft; and $\kappa_{i,2}$ denotes the temporal likelihood factor of the $i^{th}$ aircraft.

In some embodiments of the present disclosure, the confidence module may dynamically assess data reliability, and the flight intent module may predict the region that the aircraft is likely to arrive in the future, thereby enabling rapid response to short-term weather changes and efficient collaboration.

In 233, the two-way communication network is constructed for transmitting sparse and critical feature information, to realize a reduction in an air-to-air communication bandwidth without affecting a perception accuracy. In some embodiments, operation 233 may be performed by a communication module 350.

The communication module refers to a module for communication in the aircraft. In some embodiments, the communication module 350 may include a perception request acquisition module 351 and a feature information extraction module 352, as shown in FIG. 3. The perception request acquisition module 351 refers to a module for acquiring a perception request, and the feature information extraction module 352 refers to a module for extracting feature information.

Furthermore, operation 233 may be implemented through operations Q1 to Q2.

In Q1, the perception confidence level of each of the multiple aircraft is confirmed, and at least one perception request of other aircraft is received. In some embodiments, the operation Q1 may be performed by the perception request acquisition module 351.

The perception request of an aircraft refers to a metric that reflects a degree of collaborative demand required by an aircraft in a region in which the aircraft is currently located. The larger the value of the perception request is, the greater the degree of collaborative demand required by the aircraft in the region to supplement perception information.

Figure 4:
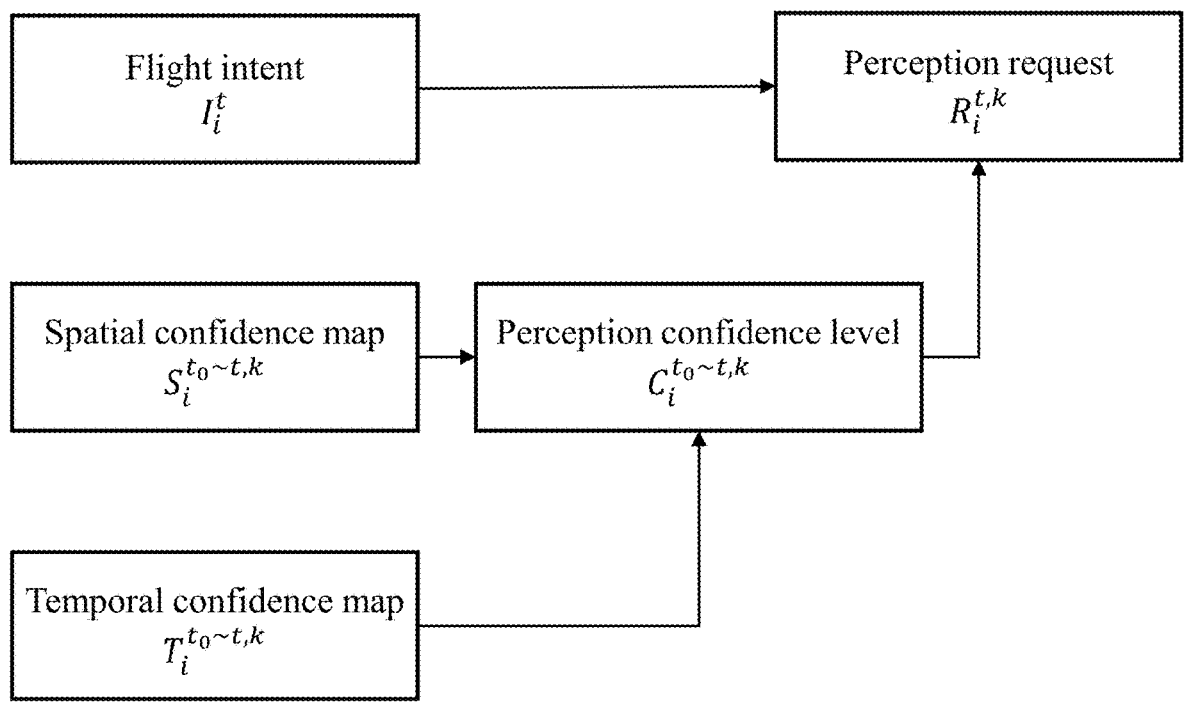
FIG. 4 is an exemplary schematic diagram illustrating the determination of a perception request according to some embodiments of the present disclosure.

FIG. 4 is an exemplary schematic diagram illustrating the determination of a perception request according to some embodiments of the present disclosure.

In some embodiments, as shown in FIGS. 3 and 4, the communication module 350 may obtain the perception request of the aircraft based on a spatial confidence map $$S_i^{t_0 \sim t,k}$$

and a temporal confidence map $$T_i^{t_0 \sim t,k}$$

output by the confidence module 320, as well as a flight intent $$I_i^t$$

output by the flight intent module 340.

For example, the perception request may be obtained by Equation (10):

$$R_i^{t,k} = \partial\left(\left(1 - C_i^{t_0 \sim t,k}\right) + \alpha I_i^t\right), \quad (10)$$

wherein $$R_i^{t,k}$$

denotes a perception request of the $i^{th}$ aircraft in the $k^{th}$ communication round at the time $$t; C_i^{t_0 \sim t,k}$$

denotes a perception confidence level of the $i^{th}$ aircraft at the time t, $$I_i^t$$

denotes a flight intent of the $i^{th}$ aircraft at the time t, $\partial$ denotes a softmax function, and $\alpha$ denotes an adjustable parameter.

The perception confidence level refers to a level of trustworthiness of the perception of the aircraft. In some embodiments, the perception request acquisition module 351 may acquire the perception confidence level of the aircraft based on the spatial confidence map $$S_i^{t_0 \sim t,k}$$

and the temporal confidence map $$T_i^{t_0 \sim t,k}$$

output by the confidence module 320. Merely by way of example, the perception confidence level may be obtained by Equation (11):

$$C_i^{t_0 \sim t,k} = S_i^{t_0 \sim t,k} T_i^{t_0 \sim t,k}, \quad (11)$$

wherein $$C_i^{t_0 \sim t,k}$$

denotes the perception confidence level of the $i^{th}$ aircraft in the $k^{th}$ communication round in a preset time period $$t_0 \sim t; S_i^{t_0 \sim t,k}$$

denotes the spatial confidence map of the $i^{th}$ aircraft in the $k^{th}$ communication round in the preset time period $t_0 \sim t$, and $$T_i^{t_0 \sim t,k}$$

denotes the temporal confidence map of the $i^{th}$ aircraft in the $k^{th}$ communication round in the preset time period $t_0 \sim t$.

In some embodiments, $$S_i^{t_0 \sim t,k}$$

and $$T_i^{t_0 \sim t,k}$$

are composed by concatenating the spatial confidence map $$S_i^{t,k}$$

and the temporal confidence level $$T_i^{t-\Delta t,k}$$

corresponding to multiple time points in the preset time period $t_0 \sim t$. The $t_0 \sim t$ refers using radar echo RGB information within the present time period as an input to the network. The present time period $t_0 \sim t$ may be discontinuous, and there may be a time interval between to and t. The time interval is related to an acquisition resolution of a weather radar. For example, the time interval may be 6 min.

In Q2, feature information is extracted based on the perception confidence level of each of the multiple aircraft and the received perception request from other aircraft. In some embodiments, operation Q2 may be performed by the feature information extraction module 352.

Figure 5:
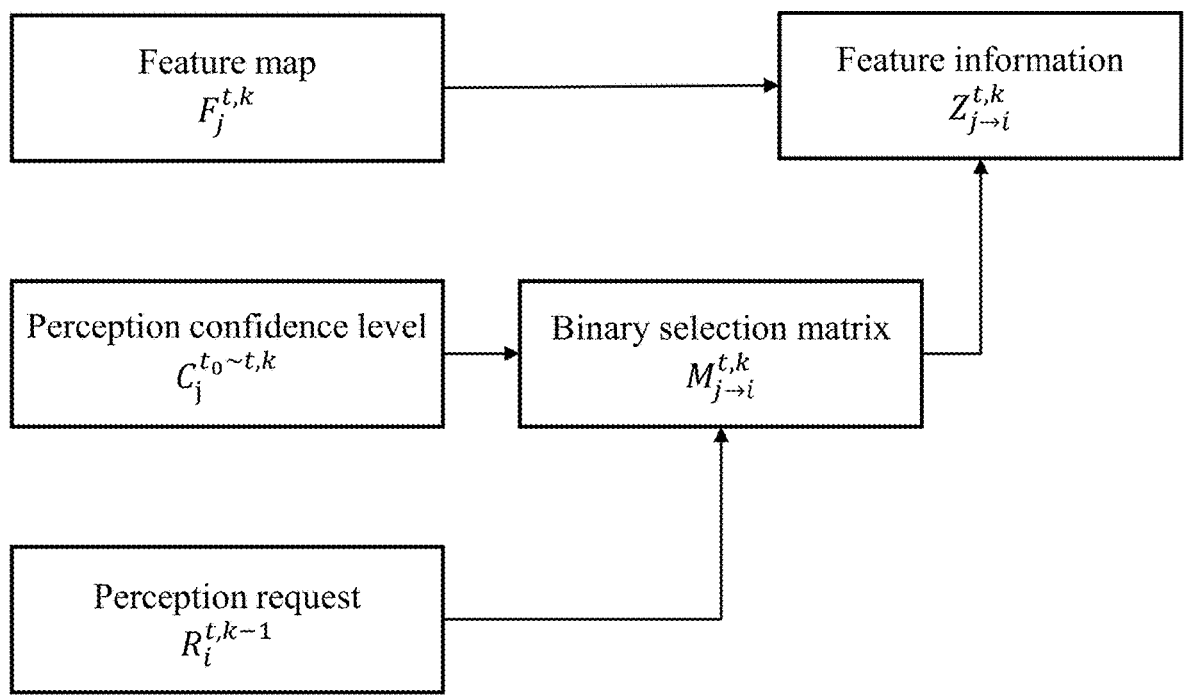
FIG. 5 is an exemplary schematic diagram illustrating the extraction of feature information according to some embodiments of the present disclosure.

FIG. 5 is an exemplary schematic diagram illustrating the extraction of feature information according to some embodiments of the present disclosure.

In some embodiments, as shown in FIG. 5, the feature information extraction module 352 may obtain a binary selection matrix $$M_{j \to i}^{t,k}$$

based on the perception confidence level $$C_j^{t_0 \sim t,k}$$

and a perception request $$R_i^{t,k-1}.$$

In some embodiments, the binary selection matrix refers to a matrix that determines whether an observation region is selected. Merely by way of example, the value of an element in the binary selection matrix represents whether or not the observation region is selected. An element with a value of 1 represents that the feature information of the observation region needs to be transmitted, and an element with a value of 0 represents that the feature information of the observation region does not need to be transmitted.

In some embodiments, operation Q2 may be implemented through operations Q11 to Q12.

In Q11, the binary selection matrix may be obtained by Equation (12):

$$M_{j \to i}^{t,k} = \begin{cases} \Phi_{select}\left(C_j^{t_0 \sim t,k}, B\right) \in \{0, 1\}^{H \times W}, & k = 0 \\ \Phi_{select}\left(C_j^{t_0 \sim t,k} \odot R_i^{t,k-1}, B, \in \{0, 1\}^{H \times W}, & k > 0 \end{cases}, \quad (12)$$

wherein $$M_{j \to i}^{t,k}$$

denotes the binary selection matrix; $\odot$ denotes element-wise multiplication of matrices, $$R_i^{t,k-1}$$

denotes the perception request of the $i^{th}$ aircraft in the $(k-1)^{th}$ communication round at the time t; B denotes a communication bandwidth; and $\Phi_{select}(\cdot)$ denotes a selection function.

The selection function $\Phi_{select}(\cdot)$ is configured to select a critical region for transmission based on the input perception confidence level map and the perception request at a given communication bandwidth. The critical region refers to a hazardous region such as a region with thunderstorms, precipitation, and a radar shadow zone.

The feature information refers to information transmitted by the aircraft. In some embodiments, the feature information extraction module 352 may extract the feature information based on the binary selection matrix.

In Q12, the feature information may be obtained by Equation (13):

$$Z_{j \to i}^{t,k} = F_j^{t,k} \odot M_{j \to i}^{t,k} \in R^{H \times W \times D}, \quad (13)$$

wherein $$Z_{j \to i}^{t,k}$$

denotes the feature information transmitted by the $i^{th}$ aircraft to the $j^{th}$ aircraft in the $k^{th}$ communication round at the time t;

$$F_j^{t,k}$$

denotes the feature map of the $j^{th}$ aircraft in the $k^{th}$ communication round at the time t;

$$M_{j \to i}^{t,k}$$

denotes the binary selection matrix for the transmission of information from the $i^{th}$ aircraft to the $j^{th}$ aircraft in the $k^{th}$ communication round at the time t; $\odot$ denotes the element-wise multiplication of matrices; and H, W, and D represent a length, a width, and a count of channels of the feature map, respectively.

In some embodiments of the present disclosure, by determining the critical region and transmitting only the feature information of the critical region, the transmission of unnecessary data is reduced, which ensures the perception accuracy while reducing the bandwidth occupancy and improves the efficiency of information sharing and the overall robustness of the system.

It may be understood that through Equation (12), the transmission of the feature information of the critical region may be selected. To prioritize the transmission of important data, key data within the critical region may be further selected for transmission.

In some embodiments, the communication module 350 may transmit the feature information in various ways. For example, the communication module 350 may transmit the feature information of the critical region based on an information priority and a transmission communication delay.

The information priority refers to a priority level of the feature information. The feature information may include the spatial position, the motion data, the weather, the observation image, and the static information.

In some embodiments, the information priority may be determined in various ways. For example, the information determination unit 150 may randomly select a plurality of sets of samples, wherein each set of sample contains six pieces of data, i.e., N1, N2, N3, N4, N5, and N. The N denotes standard data containing the spatial position, the motion data, the weather, the observation image, and the static information. N1, N2, N3, N4, N5, and N6 denote missing data, each of which missing one item from the spatial position, the motion data, the weather, the observation image, and the static information in N. The information determination unit 150 may input the plurality of sets of samples into the fusion model, with one standard result (i.e., a result of the standard data) and five missing results (i.e., results of the missing data) obtained for each set of samples. The information determination unit 150 may determine differences between the five missing results and the standard result, respectively, and determine an average value of the differences. The larger the average value of the differences is, the higher the information priority is.

The transmission communication delay refers to a time delay experienced during data transmission.

In some embodiments, the communication module 350 may determine an amount of data that may be effectively transmitted by each communication channel based on transmission communication delays of a plurality of communication channels. A communication channel is a channel for transmitting data. Effective transmission refers to the transmission of complete data without missing the feature information.

For example, the communication module 350 may determine, by querying a preset table, the count of the data that may be effectively transmitted by the each communication channel during a preset time period under a plurality of transmission communication delays corresponding to the plurality of communication channels. The amount of the data is negatively correlated to the transmission communication delay. The preset time period may be preset by a person skilled in the art based on experience.

The preset table may be constructed based on historical data and contains the amount of data effectively transmitted by the plurality of communication channels during the preset time period and the transmission communication delays corresponding to the plurality of communication channels.

In some embodiments, the communication module 350 may sort the feature information to be transmitted in order of the information priority from highest to lowest, starting transmission of data with a highest priority until a target amount of data has been transmitted, and determine the transmitted data as key data. The target amount of data refers to a total amount of data to be transmitted. For example, the target amount of data may be an amount of data that can be effectively transmitted by a communication channel within the preset time period under the given transmission communication delay.

In some embodiments of the present disclosure, determining the order of feature information transmission based on the information priority ensures that the feature information of important key data is transmitted first. Determining the amount of data that can be effectively transmitted based on the transmission communication delay of the communication channel ensures the effectiveness and completeness of the feature information. By transmitting the feature information of the key data within the critical region, bandwidth usage is further reduced.

In some embodiments, the communication module 350 may also transmit the feature information of the critical region based on the information priority, the transmission communication delay, and an environmental anomaly value of the critical region.

The environmental anomaly value refers to a value used to characterize the stability of a transmission environment.

In some embodiments, the environmental anomaly value is determined based on a geomagnetic storm value, a solar noise quantification value, an atmospheric noise value, and a terrain value. For example, the environmental anomaly value may be determined by Equation (14):

$$HJ = \omega_1 DC + \omega_2 TY + \omega_3 DQ + \omega_4 DX \quad (14),$$

wherein HJ denotes the environmental anomaly value, DC denotes the geomagnetic storm value, TY denotes the solar noise value, DQ denotes the atmospheric noise value, DX denotes the terrain value, $\omega_1$, $\omega_2$, $\omega_3$ and $\omega_4$ denote a geomagnetic storm coefficient, a solar noise coefficient, an atmospheric noise coefficient, and a terrain coefficient, respectively.

The geomagnetic storm value, the solar noise value, the atmospheric noise value, and the terrain value may be set by looking up relevant information or by a person skilled in the art based on experience. For example, the terrain value is positively correlated to an elevation difference between a highest point and a lowest point in a preset region. The larger the elevation difference and the more complex the terrain, the larger the terrain value is. $\omega_1$, $\omega_2$, $\omega_3$, and $\omega_4$ are correlated to a flight altitude of the aircraft, which may be set by a person skilled in the art based on experience. For example, the higher the flight altitude of the aircraft is, the larger an influence of the solar noise value and an influence of the atmospheric noise value are, thus the large the values of $\omega_2$ and $\omega_3$ may be adjusted accordingly. The higher the flight altitude of the aircraft is, the smaller an influence of the geomagnetic storm value and an influence of the terrain value are, thus the smaller the values of $\omega_1$ and $\omega_4$ may be adjusted accordingly.

In some embodiments, if the environmental anomaly value is relatively large, the communication module 350 may appropriately reduce the target amount of data. An extent of the reduction of the target amount of data may be set by a person skilled in the art based on experience.

In some embodiments of the present disclosure, the larger the environmental anomaly value is, the more unstable the transmission environment is. Even if the transmission communication delay of the communication channel is small at this time, data may encounter more interference during future transmission, increasing the risk of data loss. Therefore, the stability of the transmission environment during the future transmission can be determined based on the environmental anomaly value, allowing for adjustments to the amount of data transmitted subsequently to ensure transmission quality.

In 234, a cooperative directed graph among the multiple aircraft is constructed.

The cooperative directed graph refers to a graphical representation of information exchange between the multiple aircraft. Nodes in the cooperative directed graph represent the multiple aircraft, and edges in the cooperative directed graph indicates that there is an exchange of information among the nodes (i.e., the aircraft) connected by the edges.

In some embodiments, the cooperative directed graph among the multiple aircraft is represented by an adjacency matrix $A^{t,k}$ for the $k^{th}$ communication round at the time t. The adjacency matrix $A^{t,k}$ consists of adjacent aircraft, wherein the $i^{th}$ aircraft and the $j^{th}$ aircraft form a pair of adjacent aircraft.

In some embodiments, the pair of adjacent aircraft, denoted as $$A_{i,j}^{t,k},$$

consists of the $i^{th}$ aircraft and the $j^{th}$ aircraft in the $k^{th}$ communication round at the time t, and may be obtained by Equation (15):

$$A_{i,j}^{t,k} = \begin{cases} 1, & k = 0 \\ \max(M_{j \to i}^{t,k})_{h,w} \in \{0, 1\}, & k > 0 \end{cases} \quad (15)$$

wherein $$A_{i,j}^{t,k}$$

denotes the pair of adjacent aircraft consisting of the $i^{th}$ aircraft and the $j^{th}$ aircraft in the $k^{th}$ communication round at the time t;

$M_{j \to i}^{t,k}$ denotes the binary selection matrix in space for the information transmitted from the $i^{th}$ aircraft to the $j^{th}$ aircraft in the $k^{th}$ communication round at the time t; and k denotes the communication round for the $i^{th}$ aircraft.

In 235, based on a Transformer structure of the multi-head attention mechanism and the cooperative directed graph of the multiple aircraft, an information fusion module 360 is constructed to obtain an information fusion function.

The information fusion function refers to a function that fuses the spatiotemporal confidence level and the flight intent.

In some embodiments, the information fusion module 360 may obtain the information fusion function by Equation (16):

$$ATT_{j \to i}^{t,k} = softmax\left(\frac{F_i^{t,k}(Z_{j \to i}^{t,k})^T}{\sqrt{d_Z}}\right) Z_{j \to i}^{t,k}, \quad (16)$$

wherein $ATT_{j \to i}^{t,k}$ denotes an information fusion function under an attention weight of information transmitted by the $j^{th}$ aircraft to the $i^{th}$ aircraft in the $k^{th}$ communication round the time t;

$F_i^{t,k}$ denotes the feature map in the $k^{th}$ communication round at the time t;

$Z_{j \to i}^{t,k}$ denotes the information transmitted by the $j^{th}$ aircraft to the $i^{th}$ aircraft in the $k^{th}$ communication round at the time t; T represents a matrix transpose operation; $d_z$ denotes a dimension of $Z_{j \to i}^{t,k}$.

In 236, based on the spatiotemporal confidence level, the flight intent of the aircraft, the sparsely connected two-way communication network, and the information fusion function, a fusion feature map $F_i^{t,k+1}$ output by the fusion model of the $i^{th}$ aircraft in the $k^{th}$ communication round at the time t, which adaptively fuses information from different aircraft to obtain a fusion result of a next communication round, thereby enhancing a breadth and an accuracy of the aircraft's perception of the meteorological condition in airspace.

The fusion feature map refers to a map that fuses features such as the spatiotemporal confidence level, the flight intent of the aircraft, the sparsely connected two-way communication network, and the information fusion function. In some embodiments, the fusion model may be configured to obtain the fusion feature map by Equation (17):

$$F_i^{t,k+1} = \Phi_{FFN}\left(\sum_{j \in N_i} Att_{j \to i}^{t,k} \odot Z_{j \to i}^{t,k}\right) \in R^{H \times W \times D}, \quad (17)$$

wherein $F_i^{t,k+1}$ denotes the fusion feature map of the $i^{th}$ aircraft in the $k^{th}$ communication round at the time t; $\Phi_{FFN}$ denotes a feed-forward network; $N_i$ denotes a neighboring aircraft of the $i^{th}$ aircraft in the adjacency matrix $A^{t,k}$;

$ATT_{j \to i}^{t,k}$ denotes the information fusion function under the attention weight of information transmitted by the $j^{th}$ aircraft to the $i^{th}$ aircraft in the $k^{th}$ communication round at the time t;

$Z_{j \to i}^{t,k}$ denotes the information transmitted from the $j^{th}$ aircraft to the $i^{th}$ aircraft in the $k^{th}$ communication round at the time t; $\odot$ denotes element-wise multiplication of matrices; R denotes a real number; and H, W, and D represent the length, the width, and the count of channels of the feature map, respectively.

The feed-forward network $\Phi_{FFN}$ is used to perform a nonlinear transformation on weighted feature information to output a reconstructed feature. The reconstructed feature refers to feature information after reconstruction.

In 237, whether a current communication round k is greater than or equal to K is determine. If k is greater than or equal to K, the fusion model is obtained. If k is less than K, set k=k+1, and return to operation 231.

In some embodiments of the present disclosure, the fusion model, constructed based on a multimodal data fusion algorithm and a multi-head attention mechanism, can efficiently fuse the meteorological conditions of the multiple aircraft, thereby generating perception result images with higher accuracy, completeness, and spatial resolution.

In 240, a perception result image of a target aircraft is generated based on the fusion model. In some embodiments, operation 240 may be performed by the image generation unit 140.

The fusion model refers to a model that fuses the observation images of meteorological conditions from the multiple aircraft.

A perception result image 380 is a fused image of the observation images of the multiple aircraft. For example, the perception result image may be an RGB image converted based on the fusion feature map. The fusion feature map is determined based on the fusion model.

In some embodiments, a decoder 370 may convert the fusion feature map $$F_i^{t,k+1}$$

based on the fusion model into a perception result image $$O_i^t,$$

which IS used as an output of the system for cooperative airborne meteorological perception with multiple aircraft.

In some embodiments, the decoder refers to a component that converts the fusion feature map into an RGB image. The decoder may include two convolutional layers and one ReLU activation layer. A convolution kernel of the two convolutional layers may be 3×3, and a padding of the two convolutional layers may be 1.

Merely by way of example, the decoder may obtain the perception result image $$O_i^t$$

by Equation (18):

$$O_i^t = \Phi_{dec}(F_i^{t,k+1}), \quad (18)$$

wherein $$O_i^t$$

denotes the perception result image; $\Phi_{dec}$ denote the decoder, and $$F_i^{t,k+1}$$

denotes the fusion feature map, which may have 16 channels.

$$O_i^t$$

may be an RGB image having 3 channels.

Figure 6:
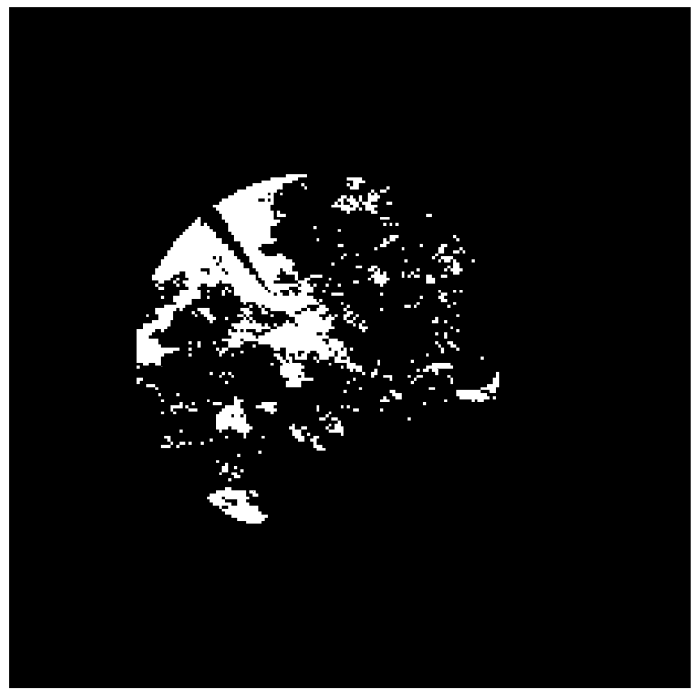
FIG. 6 is a schematic diagram illustrating an exemplary observation image of a meteorological condition input to a fusion model according to some embodiments of the present disclosure.

FIG. 6 is a schematic diagram illustrating an exemplary observation image of a meteorological condition input to a fusion model according to some embodiments of the present disclosure. The observation image is an image obtained from the onboard weather radar scan of an aircraft. The pixel color represents the magnitude of radar echo intensities of corresponding regions, and a region with no color indicates no echo. The greater the radar echo intensity of a region is, the greater the intensity of precipitation, hail, and thunderstorms in the region is. A fan-shaped gap in the upper-left corner of the radar echo represents a radar shadow zone, where the aircraft cannot obtain weather information, thus posing significant danger.

Figure 7:
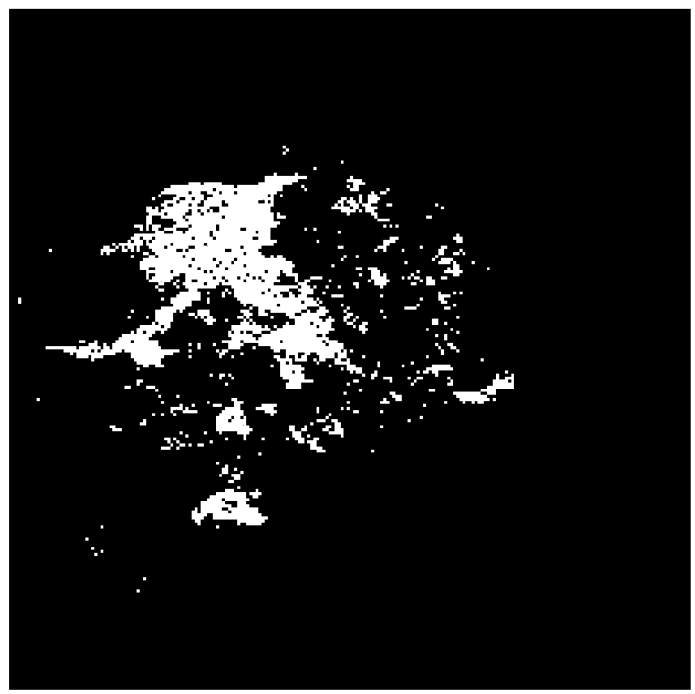
FIG. 7 is a schematic diagram illustrating an exemplary perception result image obtained based on a method for cooperative airborne meteorological perception with multiple aircraft according to some embodiments of the present disclosure.

FIG. 7 is a schematic diagram illustrating an exemplary perception result image obtained based on a method for cooperative airborne meteorological perception with multiple aircraft according to some embodiments of the present disclosure. As shown in FIG. 6 and FIG. 7, the perception result image has a larger detection range, a higher accuracy, and supplements information in the radar shadow zone, thereby significantly improving flight safety.

The target aircraft refers to an aircraft for which the perception result image is to be determined. A count of the target aircraft may be multiple.

In some embodiments, the image generation unit 140 may determine the fusion feature map of the target aircraft by the fusion model, so as to generate the perception result image of the target aircraft based on the decoder.

In 250, flight risk information of the target aircraft is determined based on the perception result image. In some embodiments, operation 250 may be performed by the information determination unit 150.

The flight risk information of the target aircraft refers to information related to a flight risk of the target aircraft. In some embodiments, the flight risk information includes at least one region and a flight risk factor corresponding the region. The flight risk factor refers to a coefficient used to measure the flight risk.

In some embodiments, the information determination unit 250 may determine the flight risk factor in various ways. For example, the information determination unit 250 may determine weather in the perception result image related to a target flight route based on the target flight route of the target aircraft, and determine the flight risk factor by querying a second table based on the weather.

The second table may be constructed based on historical data, and the second table contains a plurality of weather conditions and flight risk factors corresponding to the weather conditions. In some embodiments, the flight risk factor corresponding to a weather condition is positively correlated with a flight difficulty level and a flight accident rate under the weather condition. Merely by way of example, the flight risk factor may be calculated as: the flight risk factor=$k_1$×the flight difficulty level+$k_2$×the flight accident rate, wherein $k_1$ and the $k_2$ refer to a flight difficulty level coefficient and a flight accident rate coefficient, respectively, and are preset by a person skilled in the art based on experience.

In some embodiments, the flight difficulty level is positively correlated to a flight margin. The flight margin refers to a difference between a designed time and an actual time for the aircraft to fly a specified route. The designed time refers to an estimated time required for the aircraft to fly the route during a route design phase, and the actual time refers to a time it takes for the aircraft to fly the specified route in reality. It may be understood that there may be a variety of uncontrollable factors during the flight, so the actual time for the aircraft to fly the route may vary each time. Therefore, the designed time may be greater than the actual time, and the flight margin is a positive value.

The flight accident rate may be statistically obtained based on historical flight data. For example, the flight accident rate may be a ratio of a count of flights with accidents to a total count of flights on the specified route. The accidents may include an instrument failure, a hydraulic failure, an electromagnetic wave interference, or the like.

In some embodiments, the information determination unit 150 may designate flight risk coefficients and corresponding regions along a route as the flight risk information. The regions along the route refer to strip-shaped regions that the route passes through.

In some embodiments of the present disclosure, based on the flight difficulty level and the flight accident rate, the flight risk of the aircraft can be predicted in advance, which facilitates timely adjustment of the flight plan, thereby improving flight safety.

In 260, a route alarm command is determined based on the flight risk information and a risk threshold, and the route alarm command is sent to a management user interface and an interactive device of the target aircraft. In some embodiments, operation 260 may be performed by the instruction determination unit 160.

The route alarm command refers to a computer operation command that issues an alert when a risk region is present. The risk region refers to a region with a high probability of risk occurrence.

The management user interface refers to an interactive interface used by a management user at the ground control center.

The interactive device of the target aircraft refers to an interactive device onboard the target aircraft. In some embodiments, when the interactive device of the target aircraft receives the route alarm command, the interactive device may perform a rerouting action.

In some embodiments, the instruction determination unit 160 may determine a region where the flight risk coefficient is greater than a risk threshold in the flight risk information of the aircraft as the risk region. In response to the determining the risk zone, the instruction determination unit 160 may generate the route alarm command and send the route alarm command to the management user interface and the interaction device of the target aircraft to alert a technician to change the flight route.

The risk threshold refers to a criterion used to determine whether a region is a risk region.

In some embodiments, the risk threshold is related to a route operating duration, a usage duration of the target aircraft, and a network sparsity value of the two-way communication network. For example, the risk threshold of the aircraft may be calculated as: the risk threshold of the aircraft=$k_3 \times$the route operating duration+$k_4 \times$the usage duration of the target aircraft+$k_5 \times$the network sparsity value of the two-way communication network, wherein $k_3$, $k_4$, and $k_5$ refer to a route operating duration coefficient, an aircraft operational duration coefficient, and a network sparsity coefficient, respectively, which may be set by a person skilled in the art based on experience.

The route operating duration refers to a duration for which the target aircraft is scheduled to operate on the route. The route operating duration may be determined based on historical flight data, such as a time period from a time of an earliest flight to a current time. The usage duration of the target aircraft may be determined based on a time period from a manufacturing date of the target aircraft to the current time. In some embodiments, the longer the route operating duration and the shorter the usage duration of the target aircraft are, the lower the risk threshold for the target aircraft is.

The network sparsity value refers to a sparsity level of communication channels in the two-way communication network that are connected to the target aircraft. In some embodiments, the network sparsity value of the two-way communication network may be a ratio of a count of the communication channels in the two-way communication network that are connected to the target aircraft to a total count of communication channels in the two-way communication network.

It may be understood that the larger the network sparsity value is, the fewer the connections between the target aircraft and other aircraft, indicating that information transmission paths are limited and information transfer becomes more difficult. Therefore, the probability of the aircraft encountering danger increases. As a result, the risk threshold may be appropriately decreased, and an extent of the decrease may be set by a person skilled in the art based on experience.

In 270, in response to obtaining a route adjustment parameter from the management user interface, at least one of the following operations is performed: adjusting an engine velocity based on an engine sub-parameter, adjusting an aileron pressure based on an aileron sub-parameter, adjusting an elevator deflection based on an elevator sub-parameter, and adjusting a rudder deflection based on a rudder sub-parameter. In some embodiments, operation 270 may be performed by the adjustment unit 170.

The route adjustment parameter refers to a parameter used to adjust the flight route. In some embodiments, the route adjustment parameter may include at least one of the engine sub-parameter, the aileron sub-parameter, the elevator sub-parameter, and the rudder sub-parameter The engine sub-parameter is a parameter used to adjust an engine. For example, the engine sub-parameter is used to adjust the engine velocity.

The aileron sub-parameter is a parameter used to adjust an aileron. For example, the aileron sub-parameter is used to adjust the aileron pressure.

The elevator sub-parameter is a parameter used to adjust an elevator. For example, the elevator sub-parameter is used to adjust the elevator deflection.

The rudder sub-parameter is a parameter used to adjust a rudder. For example, the rudder sub-parameter is used to adjust the rudder deflection.

In some embodiments, in response to determining that the management user interface received the route alarm command, the management user interface may generate a route adjustment parameter and send the route adjustment parameter to the adjustment unit 170. The adjustment unit 170 may adjust the engine, the aileron, the elevator, and the rudder of the aircraft based on the route adjustment parameter, thus causing the aircraft to change course.

In some embodiments of the present disclosure, based on data sharing and information fusion between multiple aircraft, deficiencies in perception caused by factors such as radar blind spots or distance attenuation in a single aircraft can be compensated. This improves the perception range of the key region under conditions of complex airspace, high aircraft density, and adverse weather (e.g., strong thunderstorms, low visibility, etc.), thereby enhancing flight safety. Furthermore, during the flight of the aircraft, if a potential hazard is encountered, the flight management system can send information about the potential hazard to the ground control center. After comprehensive analysis, the ground control center can provide flight suggestions manually or automatically, and send them to the flight management system of the aircraft, thereby reducing the likelihood of encountering danger during subsequent flights.

In some embodiments, the training set determination unit 110 may determine a data set based on the spatial position, the motion data, the weather, the observation image, and the static information; and determine a training set and a test set based on an integrated information priority of the data set.

The data set refers to a set of data used to train or test the fusion model. In some embodiments, the data set may include training samples and corresponding labels. For more descriptions of the raining sample and the label, please refer to the relevant descriptions in FIG. 6.

The integrated information priority refers to a priority level of the data set. In some embodiments, the integrated information priority may be determined in various ways. For example, if a data set misses at least one piece of feature information from the spatial position, the motion data, the weather, the observation image, and the static information, the training set determination unit 110 may determine an average value of at least one information priority corresponding to the at least one piece of feature information. The larger the average value is, the higher the integrated information priority of the data set is. For more descriptions of the information priority and the feature information, please refer to the related descriptions of operation Q12.

In some embodiments, the training set determination unit 110 may determine the training set and the test set in various ways based on the integrated information priority of the data set. For example, the training set determination unit 110 may divide a plurality of data sets into a plurality of levels based on integrated information priorities of the data sets, classify the data sets into a plurality of databases according to the levels, and then randomly extract a preset proportion of data sets from each database to form the training set and the test set.

The preset proportion is related to whether the extracted data set is used to form the training set or the test set. For example, if the test set and the training set are formed in a ratio of 3:7 and the extracted data set is used to form the training set, the training set determination unit 110 may extract a proportion of 0.7 of the data sets from the database.

In some embodiments of the present disclosure, dividing the data set into a plurality databases based on the integrated information priorities of the data sets, and randomly extracting datasets at the preset proportion to form the training set and the test set can ensure a balanced ratio between the training set and the test set. This helps avoid issues of overfitting or underfitting of the fusion model and improves the generalization capability and prediction accuracy of the fusion model.

In some embodiments, a learning rate of the training set is related to at least one of an image deviation value and a rerouting count in the training set.

The image deviation value is a deviation value obtained by comparing an intermediate perception image with a measured perception image obtained from an actual measurement. It may be understood that the measured perception image may be used as the truth perception image. For more descriptions of the truth perception image, please refer to the related descriptions above.

The intermediate perception image refers to an image generated by an intermediate fusion model. The intermediate fusion model refers to an untrained fusion model. For example, an intermediate fusion model generated in the $(k-1)^{th}$ communication round may generate an intermediate perception image of the $k^{th}$ communication round.

In some embodiments, the image deviation value may be a ratio of a difference between an information volume of the intermediate perception image and an information volume of the measured perception image to the information volume of the measured perception image. Merely by way of example, if the information volume of the measured perception image is rainfall, a thunderstorm, a wind velocity, turbulence, and a temperature distribution, and the information volume of the intermediate perception image is the rainfall, the turbulence, and the temperature distribution. Then the difference between the information volume of the measured perception image and the information volume of the intermediate perception image is the thunderstorm and the wind velocity, and the image deviation value is the ratio of the difference between the information volume (i.e., the thunderstorm and the wind velocity) of the intermediate perception image to the information volume (i.e., the rainfall, the thunderstorm, the wind velocity, the turbulence, and the temperature distribution) of the measured perception image.

In some embodiments, when a parameter of the intermediate fusion model is updated based on a training set s in an $m^{th}$ iteration round, a learning rate $$n_s^m$$

of the training set s is negatively correlated to the current $m^{th}$ iteration round and a corresponding image deviation value of the training set s. The image deviation value is an image deviation value of a communication round closest to the $m^{th}$ iteration round.

In some embodiments, the smaller the value of m in the $m^{th}$ iteration round is, the further the training is from completion, thus a step size for updating parameters of the fusion model may be appropriately increased to accelerate convergence. The smaller the value of the deviation of the image corresponding to the training set s is, the closer the intermediate perception image is to the measurement-perceived image, i.e., the closer the intermediate perception image is to the truth value perception image, the smaller the learning rate $$n_s^m$$

is.

It may be understood that the measured perception image may only be obtained by measuring for a non-risk region for the flight of the aircraft. For a risk region that poses a threat to the flight of the aircraft, the aircraft must detour, making measurement impossible.

In some embodiments, for the risk region, the model generation unit 130 may determine the learning rate of the training set based on the rerouting count. The rerouting count refers to a count of aircraft that change their flight routes based on the intermediate perception image.

In some embodiments, the smaller the value m in the $m^{th}$ iteration rounds is, the larger the rerouting count corresponding to the training set s is, the more dangerous the region is, indicating a higher learning value for the training set, and thus the larger the corresponding learning rate $$n_s^m$$

is.

In some embodiments of the present disclosure, determining the learning rate of the training set based on the image value deviation and the rerouting count can accelerate model convergence, avoid an unstable training process, improve the generalization ability of the fusion model, and optimize training efficiency.

The basic concepts are described above. Obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements and corrections are suggested in present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This manner of disclosure does not, however, imply that the subject matters of the disclosure requires more features than are recited in the claims. Rather, claimed subject matters may lie in less than all features of a single foregoing disclosed embodiment.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for cooperative airborne meteorological perception with multiple aircraft, comprising:
    collecting a spatial position and motion data of each of the multiple aircraft from at least one of a Global Positioning System (GPS), an inertial navigation system, and a flight management system disposed on each of the multiple aircraft;
    collecting an observation image and weather of each of the multiple aircraft from a weather radar disposed on each of the multiple aircraft;
    collecting static information of each of the multiple aircraft from the flight management system disposed on each of the multiple aircraft;
    determining a training set based on the spatial position, the motion data, the weather, the observation image, and the static information;
    determining a fusion performance function of a fusion model under a constraint of a total communication bandwidth based on an objective of a cooperative perception network; wherein the fusion performance function refers to a function used to measure a difference between a predicted result of the fusion model and a truth label, the truth label refers to a label corresponding to a training sample in the training set, and the fusion performance function is expressed by:
    wherein $\theta$ denotes a parameter to be trained of the fusion model, $e(\cdot)$ denotes an image fusion evaluation metric, $\Phi_\theta(\cdot)$ denotes the fusion model, $$X_i^t$$

represents an observation image of a surrounding meteorological condition generated by an $i^{th}$ aircraft at time t; and $$Y_i^t$$

represents a truth perception image of the surrounding meteorological condition generated by the $i^{th}$ aircraft at the time t;
    obtaining a spatiotemporal confidence level based on the observation image of the aircraft's surrounding meteorological condition at a current time and in a preset past time period, wherein the spatiotemporal confidence level includes a spatial confidence map and a temporal confidence map;
    generating a flight intent based on processing of input information, wherein the input information includes at least one of the spatial position, the motion data, the weather, and the static information;

constructing a two-way communication network, wherein the two-way communication network is configured to transmit feature information between the multiple aircraft, and the feature information refers to compressed high-dimensional tensors extracted from observation images;

generating a information fusion function by fusing the spatiotemporal confidence level and the flight intent based on a transformer structure of a multi-head attention mechanism and a cooperative directed graph among the multiple aircraft under the two-way communication network; wherein the information fusion function refers to a function that fuses the spatiotemporal confidence level and the flight intent;

generating the fusion model based on the training set, the fusion performance function, the spatiotemporal confidence level, the flight intent, the two-way communication network, and the information fusion function;

generating a perception result image of a target aircraft based on the fusion model;

determining, based on the perception result image, flight risk information of the target aircraft, wherein the flight risk information includes at least one region and at least one flight risk factor corresponding to the at least one region, wherein the flight risk factor is calculated as: the flight risk factor=k1×the flight difficulty level+k2× the flight accident rate, the k1 refers to a flight difficulty level coefficient, the k2 refers to a flight accident rate coefficient, and the k1 and the k2 are preset values;

determining, based on the flight risk information and a risk threshold, a route alarm command, and sending the route alarm command to a management user interface and an interactive device of the target aircraft; and in response to obtaining a route adjustment parameter from the management user interface, performing at least one of the following operations: adjusting an engine velocity based on an engine sub-parameter, adjusting an aileron pressure based on an aileron sub-parameter, adjusting an elevator deflection based on an elevator sub-parameter, and adjusting a rudder deflection based on a rudder sub-parameter; the route adjustment parameter including at least one of the engine sub-parameter, the aileron sub-parameter, the elevator sub-parameter, and the rudder sub-parameter.

2. The method of claim 1, wherein the risk threshold is related to a route operating duration, a usage duration of the target aircraft, and a network sparsity value of the two-way communication network.

3. The method of claim 1, wherein a transmission of the feature information between the multiple aircraft includes:
transmitting the feature information of a critical region based on an information priority and a transmission communication delay; wherein
the critical region refers to an area where there are high-risk weather phenomena or communication anomalies;
the high-risk weather includes thunderstorms, precipitation, and hail; and
the area with communication anomalies includes radar shadow zones.

4. The method of claim 3, wherein the transmitting the feature information of a critical region based on an information priority and a transmission communication delay includes:
transmitting the feature information of the critical region based on the information priority, the transmission communication delay, and an environmental anomaly value of the critical region; wherein
the environmental anomaly value refers to a value calculated based on a weighted sum of normalized quantified parameters; and
the normalized quantified parameters include at least one of a geomagnetic storm index, a quantified solar noise value, an atmospheric noise value, and a terrain complexity value.

5. The method of claim 1, wherein the determining a training set based on the spatial position, the motion data, the weather, the observation image, and the static information includes:
determining a data set based on the spatial position, the motion data, the weather, the observation image, and the static information; and
determining the training set and a test set based on an integrated information priority of the data set.

6. The method of claim 1, wherein a learning rate of the training set is related to at least one of an image deviation value and a rerouting count in the training set, wherein
the image deviation value refers to a deviation value obtained by comparing an intermediate perception image with a measured perception image, wherein the measured perception image is obtained from an actual measurement;
the intermediate perception image refers to an image generated by an intermediate fusion model, wherein the intermediate fusion model refers to an untrained fusion model; and
when a parameter of the intermediate fusion model is updated based on the training set in an $m^{th}$ iteration round, the learning rate of the training set is negatively correlated to a current $m^{th}$ iteration round and a corresponding image deviation value of the training set, and the image deviation value is an image deviation value of a communication round closest to the $m^{th}$ iteration round.

7. The method of claim 1, wherein the weather includes at least one of precipitation, hail, a thunderstorm, and turbulence.

8. The method of claim 1, wherein the motion data includes at least one of an aircraft velocity, an aircraft heading angle, and a flight plan.

9. The method of claim 1, wherein the static information includes at least one of a latitude and longitude position of a waypoint or airport information; and
the airport information includes a position of a runway in the airport, a number of the runway in the airport, a length of the runway in the airport, a name of the airport, and a latitude and longitude position of the airport.

10. The method of claim 1, wherein the total communication bandwidth, denoted as B, is represented by:

$$B = \log_2(|M_{i \to j}^{t,k}| \times D \times \text{float}), k = 0, 1, 2, \ldots, K$$

wherein $M_{i \to j}^{t,k}$ denotes a binary selection matrix in space for information transmitted by the $i^{th}$ aircraft to a $j^{th}$ aircraft in a $k^{th}$ communication round at a time t, wherein each element of the binary selection matrix corresponds to a spatial grid, $$\left|M_{i\to j}^{t,k}\right|$$

represents a total count of the spatial grids selected for information transmission by calculating a number of non-zero elements in the binary selection matrix by the $i^{th}$ aircraft to the $j^{th}$ aircraft in the $k^{th}$ round of communication at the time t, the grids of the information are obtained by partitioning a feature map, D denotes a feature channel dimension; float denotes a precision coefficient; and K denotes a total count of communication rounds.

11. The method of claim 10, wherein the objective of the cooperative sensing network is expressed by:

$$\text{s.t.} \sum_{k=1}^{K}\sum_{i=1}^{N}\left|Z_{j\to i}^{t,k}\right| \le B$$

wherein $$Z_{j\to i}^{t,k}$$

denotes the information transmitted by the $i^{th}$ aircraft to the $j^{th}$ aircraft in the $k^{th}$ round of communication at the time t, $$\left|Z_{j\to i}^{t,k}\right|$$

denotes a communication bandwidth consumed by the transmission of the information from the $i^{th}$ aircraft to the $j^{th}$ aircraft in the $k^{th}$ round of communication at the time t, K denotes the total count of communication rounds, and N represents a total count of the multiple aircraft.

12. The method of claim 1, wherein the method further comprises:
extracting a high-dimensional feature from the observation image of the aircraft and generating feature maps for the communication of the multiple aircraft, each of the feature maps being generated by convoluting an RGB image through multiple layers of convolution to extract an edge, a texture, a geometric shape, and an intensity feature of the weather in a prediction image; wherein the high-dimensional feature refers to an abstract tensor extracted from the observation image through multiple convolutional layers, the high-dimensional feature includes the edge, the texture, the geometric shape, and the intensity feature of the weather in the observation image, the prediction image refers to a perception result image generated by fusing multi-source information through the cooperative perception network, and the multi-source information includes the spatiotemporal confidence level, the flight intent, and the information fusion function;
generating the spatial confidence map based on a feature map for each round of communication of each of the multiple aircraft; wherein the spatial confidence map is generated by applying a convolutional layer to the feature map, outputting scores in [0,1]; and
simulating temporal decay of a temporal confidence level using an exponential decay function.

13. The method of claim 1, wherein the generating a flight intent based on processing of input information includes:
generating the flight intent based on a spatial likelihood factor and a temporal likelihood factor.

14. The method of claim 1, wherein a transmission of the feature information between the multiple aircraft includes:
for an aircraft of the multiple aircraft,
determining a perception confidence level of the aircraft and a perception request received from one or more other aircraft of the multiple aircraft; wherein the perception confidence level of the aircraft refers to a level of trustworthiness of a perception of the aircraft, and the perception confidence level of the aircraft is acquired based on the spatial confidence map and the temporal confidence map; and
extracting the transmitted feature information based on the perception confidence level and the perception request.

15. A non-transitory computer-readable storage medium storing computer instructions, wherein when a computer reads the computer instructions in the storage medium, the computer implements the method for cooperative airborne meteorological perception with multiple aircraft of claim 1.

16. The method of claim 1, wherein the information fusion function is obtained as:

$$ATT_{j\to i}^{t,k} = \text{softmax}\left(\frac{F_i^{t,k}\left(Z_{j\to i}^{t,k}\right)^T}{\sqrt{d_Z}}\right)Z_{j\to i}^{t,k},$$

wherein $$ATT_{j\to i}^{t,k}$$

denotes an information fusion function under an attention weight of information transmitted by a $j^{th}$ aircraft to the $i^{th}$ aircraft in a $k^{th}$ communication round at the time t;

$$F_i^{t,k}$$

denotes the feature map in the $k^{th}$ communication round at the time t;

$$Z_{j\to i}^{t,k}$$

denotes the feature information transmitted by the $j^{th}$ aircraft to the $i^{th}$ aircraft in the $k^{th}$ communication round at the time t; T represents a matrix transpose operation; $d_z$ denotes a dimension of $$Z_{j\to i}^{t,k}.$$

17. The method of claim 1, wherein the fusion model is configured to obtain a fusion feature map by equation:

$$F_i^{t,k+1} = \Phi_{FFN}\left(\sum_{j \in N_i} ATT_{j \to i}^{t,k} Z_{j \to i}^{t,k}\right) \in R^{H \times W \times D},$$

wherein $F_i^{t,k+1}$ denotes the fusion feature map of the $j^{th}$ aircraft in a $k^{th}$ communication round at the time t; $\Phi_{FFN}$ denotes a feed-forward network; $N_i$ denotes a neighboring aircraft of the $i^{th}$ aircraft in an adjacency matrix $A^{t,k}$;

$ATT_{j \to i}^{t,k}$ denotes the information fusion function under an attention weight of information transmitted by a $j^{th}$ aircraft to the $i^{th}$ aircraft in the $k^{th}$ communication round at the time $Z_{j \to i}^{t,k}$ denotes the feature information transmitted from the $j^{th}$ aircraft to the $i^{th}$ aircraft in the $k^{th}$ communication round at the time t; $\odot$ denotes element-wise multiplication of matrices; R denotes a real number; and H, W, and D represent a length, a width, and a count of channels of the fusion feature map, respectively.

18. The method of claim 14, wherein the perception confidence level is obtained as:

$$C_i^{t_0 \sim t,k} = S_i^{t_0 \sim t,k} T_i^{t_0 \sim t,k}$$

wherein $C_i^{t_0 \sim t,k}$ denotes the perception confidence level of the $i^{th}$ aircraft in a $k^{th}$ communication round in a preset time period $t_0 \sim t$;

$S_i^{t_0 \sim t,k}$ denotes the spatial confidence map of the $i^{th}$ aircraft in the $k^{th}$ communication round in the preset time period $t_0 \sim t$; and $T_i^{t_0 \sim t,k}$ denotes the temporal confidence map of the $i^{th}$ aircraft in the $k^{th}$ communication round in the preset time period $t_0 \sim t$.

\* \* \* \* \*